US007006407B2

(12) United States Patent
Davies et al.

(10) Patent No.: US 7,006,407 B2
(45) Date of Patent: Feb. 28, 2006

(54) COMMUNICATION SYSTEM FOR UNDERWATER USE

(75) Inventors: Jonathan James Davies, Dorchester (GB); Shaun Michael Dunn, Dorchester (GB); Stephen Arthur Pointer, Dorchester (GB); Samuel William Downer, Dorchester (GB)

(73) Assignee: Qinetiq Limited, (GB)

( * ) Notice: Subject to any disclaimer, the term of this patent is extended or adjusted under 35 U.S.C. 154(b) by 0 days.

(21) Appl. No.: 10/473,754

(22) PCT Filed: Mar. 28, 2002

(86) PCT No.: PCT/GB02/01517

§ 371 (c)(1), (2), (4) Date: Oct. 1, 2003

(87) PCT Pub. No.: WO02/082696

PCT Pub. Date: Oct. 17, 2002

(65) Prior Publication Data

US 2004/0105344 A1 Jun. 3, 2004

(30) Foreign Application Priority Data

Apr. 2, 2001 (GB) .................... 0108188

(51) Int. Cl.
*H04B 11/00* (2006.01)
*H04B 13/02* (2006.01)

(52) U.S. Cl. .................................... 367/134
(58) Field of Classification Search ................ 367/131, 367/134, 901, 904

See application file for complete search history.

(56) References Cited

U.S. PATENT DOCUMENTS

| 2,141,619 | A |   | 12/1938 | Sauter ................. 110/182.5 |
| 3,867,715 | A |   | 2/1975  | Geil .................... 367/132 |
| 4,563,758 | A |   | 1/1986  | Patenostro .............. 367/132 |
| 6,125,080 | A |   | 9/2000  | Sonnenschein et al. ..... 367/134 |
| 6,130,859 | A | * | 10/2000 | Sonnenschein et al. ..... 367/134 |
| 6,133,849 | A |   | 10/2000 | McConnell et al. ... 340/825.72 |
| 6,158,041 | A |   | 12/2000 | Raleigh et al. ........... 714/792 |
| 2003/0214881 | A1 | * | 11/2003 | Yang .................... 367/134 |

FOREIGN PATENT DOCUMENTS

| EP | 0 048 779 | 4/1982 |
| EP | 0 244 629 | 11/1987 |
| GB | 2139788 | 11/1984 |
| GB | 2144949 | 3/1985 |
| WO | WO 00/58747 | 10/2000 |

\* cited by examiner

Primary Examiner—Daniel Pihulic
(74) Attorney, Agent, or Firm—McDonnell Boehnen Hulbert & Berghoff LLP

(57) ABSTRACT

For digital underwater transmission an information sequence (17) of digital bits is partitioned into a succession of symbols each comprising n bits where n is equal to or greater than one ($2^n$ potential symbols), each symbol (19) is replaced (20) a corresponding base code sequence of length m bits and the result (21) is passed to an acoustic transducer after bi-phase modulation (22) on a carrier. The code has good correlation properties, e.g. a pseudo-random maixmal length sequence, a Gold code or a Kasami code, and the value of m/n is at least (32). Preferably the base sequence is cyclically extended at one or both ends prior to modulation, and Solomon Reed redundancy coding (18) is initially applied to the information sequence. The output (23) of modulator (22) may be prefaced (26) by a pair of chirp waveforms (24). Provision is made for Doppler and multipath correction.

27 Claims, 8 Drawing Sheets

COMMUNICATION SYSTEM FOR UNDERWATER USE

Figure 1:
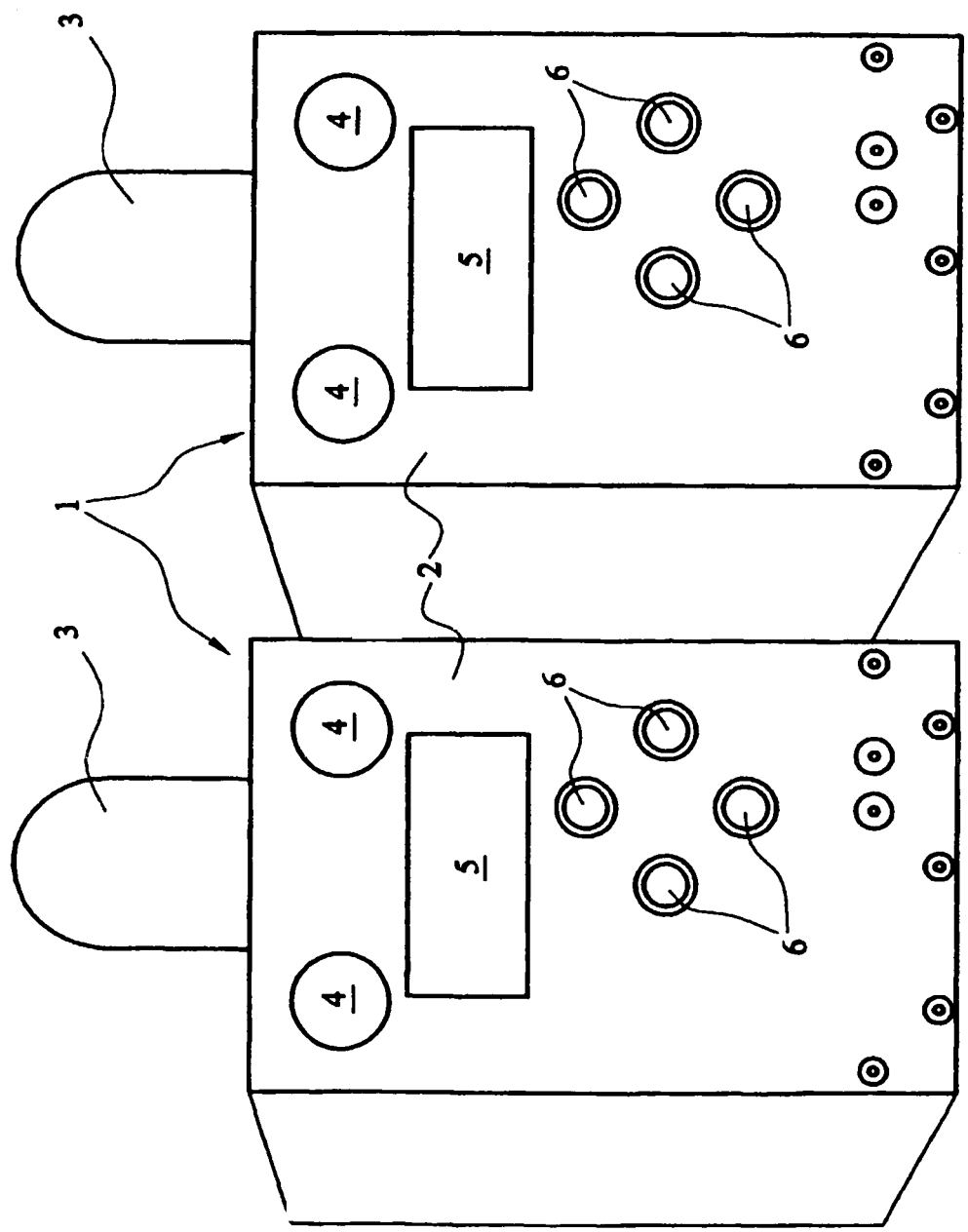

The present invention relates to communication systems suitable for use through or under water.

Communicating reliably under water is difficult. It is known to use VLF electromagnetic communication (up to 10 KHz), but this requires high power and large antennae, and so is limited to communications involving ships and submarines, being inapplicable for personal use, for example when diving.

For short range communication ultrasonic waves in the region of 20 to 600 KHz may be employed. Nevertheless signal transmission is subject to Doppler effects, non-linear speed of propagation (for example due to different regions of water density and temperature), multipath propagation (also known as reverberation); fading and other environmental disturbances including noise and other acoustic sources.

Acoustic underwater communication systems using analogue modulation of an acoustic carrier is known but is regarded as inefficient, particularly for underwater networking. A known manufactured device uses SSB modulation by a divers voice of a 32 to 40 KHz carrier. U.S. Pat. No. 4,563,758 discloses a system permitting acoustic communication between two divers which employs a voice synthesiser. Another known system relates to a diver to diver communication system where messages are determined by audible tone or duration, and a flashing beacon serves for locating the diver in an emergency. In the system disclosed in Canadian Patent Application No. 2,141,619 an AM modulated message is transferred between divers, the receiving device emitting a message which is easily audible to the diver carrying the device.

All of these analogue systems or devices are only effective over a relatively low range, typically no more than 150 metres, and the communication is "line of sight" only.

U.S. Pat. No. 6,125,080 (Divecom) relates to an underwater communication system using binary digital communication with one or more FSK carriers. Related International Patent Application No. PCT/IL00/00167 (Wulich Wave Ltd) is additionally directed to determining the angular location of a transmitter relative to a receiver, for example the location of a diver relative to a boat. In one embodiment of Divecom, each diver device of a plurality is assigned a channel comprising a pair of frequencies peculiar thereto, together with, optionally, an emergency frequency common to all devices. The device normally listens for messages only on its channel (and, the optional emergency channel. When a diver wishes to communicate, a stored message in the device is selected and modulated by a binary FSK modulator to produce a binary sequence on the channel corresponding to the desired destination device, the sequence then being passed through a DAC. Once it has been confirmed that the channel is free, by listening on that channel, the message is transmitted. The signal path for the received signal is generally the reverse of that for the transmitted signal.

In the digital systems disclosed in Divecom and Wulich Wave Ltd it is necessary for each diver device to have the ability to operate at different FSK carrier frequencies according to the destination device.

There are a number of problems associated with acoustic communication, which lead to difficulty in recovering the transmitted signal, and which may become particularly severe when the communication includes an underwater path. Narrowband signals, such as are employed in Divecom and Wulich Wave Ltd, have a tendency to fade, and it is for this reason that both of these documents disclose the use of signalling on two distinct frequency separated carriers, so that even if one signal fades the other one might be sufficiently strong to be recovered and decoded. Furthermore the transmitted signal is subject to Doppler frequency effects which may vary randomly and over a short timescale relative to the length of a transmission.

In addition, the signal is almost invariably subject to significant multi-path propagation. The available energy becomes shared between the strongest or main signal, commonly but not necessarily the direct signal, and subordinate signals which arrive after or before the main signal. Not only does this lead to a reduction in the amplitude of the main signal, but the subordinate signals can degrade the main signal during subsequent processing. The multiple paths, which define a channel structure, are also subject to random and relatively rapid variations (relative to a transmission length), both as to path length and signal strength. Significant signals other than the main signal will hereafter be referred to as "sub-signals".

Thus a major concern is to provide a method of communication which is reliable and resilient to the effect of errors however introduced, but particularly those peculiar to underwater transmission, including background noise, multi-path propagation and acoustic Doppler.

U.S. Pat. No. 6,158,041 (Raleigh) relates to a trellis coded modulation system for dealing with noise, multipath fading and other undesired transmission features in the context of satellite, microwave or telephone channels, for example, or in a magnetic disc drive.

In embodiments of the present invention, the signal is effectively relatively broadband, thereby avoiding or reducing the problem of signal fading. Furthermore, means are adopted to detect and compensate for Doppler and phase shifts in the received signal, and to detect multipath arrivals of the received signal and to process it so that the overall signal strength, and signal to noise ratio, is increased.

In the preferred embodiments of the present invention a narrowband signal is mapped to a number of relatively broadband signals with correlation properties better suited to resolving and exploiting multipath propagation in underwater environments.

It can be arranged that only a selected destination receiver is permitted to respond positively to the transmitted signal. Error correction techniques are applied to the digital signal.

While the invention is useful for divers operating singly with a surface support vessel or as a group with or without a surface support vessel, since a transceiver may be embodied as a portable or wearable device, it is also useful in any underwater communication system, for example underwater vehicles which are manned or remotely controlled, or underwater telemetry apparatus.

In a first aspect, the present invention provides a digital underwater transmission device comprising means for receiving or generating an information sequence of digital bits, means for partitioning said sequence into a succession of symbols each comprising n bits where n is equal to or greater than one, so that there are $2^n$ potential symbols, encoding means for replacing each said symbol with a corresponding code sequence of length m chips (bits), wherein the code has good correlation properties and the value of m/n is at least 32, modulating means for modulating a carrier with the signal from the coding means, and transmission transducer means coupled to the output of the modulating means for transmitting an acoustic signal through water. The first aspect extends to a method of transmitting as performed by the device.

In a second aspect, the present invention provides a digital transmission device comprising means for receiving or generating an information sequence of digital bits, means for partitioning said sequence into a succession of symbols each comprising n bits where n is equal to or greater than one, encoding means for replacing each said symbol with an extended sequence, means for modulating a carrier with the signal with the signal from the coding means, wherein the extended sequence comprises a base code sequence of length m chips (bits) corresponding to the symbol together but extended by a prefix sequence and/or a suffix sequence, the base code having good correlation properties and the value of m/n being at least 32, a said prefix sequence duplicating the chip pattern in a last portion of the base code sequence, a said suffix sequence duplicating the chip pattern in a first portion of the base code sequence. Preferably the length of a said prefix or suffix is an integer within the range $m^{1/2}$ to m/2. Preferably both a prefix and a suffix are provided, and even more preferably they have equal lengths. In the embodiment, the modulator is coupled to a transducer for transmitting acoustic waves through water.

When the carrier is received and demodulated, each extended m-sequence can be correlated with each of the $2^n$ unextended (base) m-sequences to determine which bit pattern the extended sequence represents (the maximum likelihood result). However, the signal is significantly degraded when sub-signals from multiple channels have appreciable amounts of energy therein. The use of an extended sequence can also allow an increased chance of detecting like signals from temporally spaced channels. These may then effectively be brought into synchronism with the main signal and added prior to correlation, thus improving the amplitude of that correlator output which corresponds to the code sequence in the received signal.

However, the main advantage of the use of the extended code sequences is that it allows for some time spread between the expected timing of the sequences in the received signal and the reference sequences in the correlators. At the receiver, a sequence of m-bits is extracted from the received extended sequence, from a position which is intended to correspond to the position of the originating base sequence. Due to the nature of the sequences and the fact that the extensions are cyclic, even if the extracted sequence is time displaced from the originating transmitted code sequence portion of the extended sequence, the efficacy of the correlation process is essentially unaffected. The use of both a prefix and a suffix of generally equal length, so that the base code sits generally centrally of the extended sequence, allows for indirect channels which arrive before and after the main signal.

The digital information sequence will commonly vary according to the information it is intended to convey, for example a message and/or an identifier peculiar to a receiving device. However at least a part thereof may be predetermined, corresponding to fixed information from the device, for example a fixed header sequence which can be used to help in signal processing, as will be described later, or a fixed identifier stored in and peculiar to the transmission device. The information sequence may also include a selected one from a plurality of receiving device identifiers stored in the transmission device for selective addressing of a receiving device. The transmission and/or receiving identifiers will have respective predetermined positions or slots in the information sequence for recovery thereof. In a variant, each or any of these items can be added to or inserted in the modulated signal as modulated sequences, for example a modulated fixed header sequence can be added to the front of the modulated digital sequence, and this is regarded as effectively providing an information sequence with a fixed header.

The digital information sequence may be supplied to the transmission device; alternatively or additionally the transmission device may generate at least part of the information sequence, for example by providing means including one or more of (a) a manual input means and optionally a display for responding to operation of the manual input means; (b) measurement means for measuring a condition at the transmitting device for providing at least part of said digital information sequence; and (c) voice input means.

Means may also be provided for prefacing the modulated signal with a pair of pulse signals prior to acoustic transmission. These signals may be utilised at a receiver for signal processing, and in particular for at least an initial determination of Doppler effect and/or multi-path transmission (channel structure). For this purpose, the pulse signals are preferably broad-band and/or have good correlation properties. Preferably, but not necessarily, the two pulse signals are identical. In the embodiment, a pair of chirp signals is provided, particularly described as immediately sequential identical chirps with linearly rising frequencies, but the characteristics, e.g. starting and/or end frequency, envelope shape, duration, etc. of each chirp could be varied and could be the same as or differ from the characteristics of other chirp.

Presently preferred values for n are 2 or more, for example 2, 3 or 4, for computational reasons as explained later. A preferred value of m is at least 64, more preferably at least 256.

Prior to the encoding means the transmission device may include means such as a Reed-Solomon encoder for incorporating redundancy into said information sequence for error correction.

In a third aspect, the present invention provides a digital underwater receiving device adapted for responding to a signal transmitted from a transmission device of the type according to the first and/or second aspects, the receiving device comprising means for receiving and demodulating or down-converting said signal, means for deriving from the demodulated signal a plurality of received code sequences each related to a respective one of said transmitted code sequences, first correlating means for correlating each said received code sequence with each of said $2^n$ code sequences, identification means for determining which of the code sequences provides a maximum likelihood result, and decoding means for deriving from each maximum likelihood result the corresponding decoded symbol thereby to synthesise a received information sequence. The receiving device may include means coupled to the output of the decoding means for providing a user recognisable output, such as at least one of (a) a visible display; (b) an acoustic alarm or a visible alarm; and (c) a voice synthesiser or acoustic means for reconstituting transmitted voice information derived from an audio transducer.

Taking any three sequences which are received in turn, the output of correlations on the first and second sequences is available for a determination of essentially instantaneous Doppler, for correction of the third (later) received sequence. The third block so corrected can then be used to determine channel structure, as will become clear on a consideration of the description relating to the second embodiment.

It is considered that the use of the code sequences engenders a broad band characteristic to the communication system.

For accurate identification of a received sequence, it is preferred to employ a code for which the $2^n$ sequences which are used can provide the best auto-correlation properties, such as a pseudo-random maximal length sequence (m-sequence) encoding. However, for preventing or rejecting interference from other contemporaneous transmissions it would be preferable to employ a code for which the $2^n$ sequences which are used can provide the best cross-correlation properties, such as a Gold code or a Kasami code, each of which has bounded cross-correlations. The two requirements cannot in general be met simultaneously, although the cross-correlation performance provided by pseudo-random maximal length sequence encoding, and the auto-correlation performance provided by Gold and Kasami coding are sufficiently satisfactory for the purpose.

Thus although it is necessary for the code which is selected for use in the present invention to have good correlation properties, the type of code which is selected will reflect the balance between reliability of decoding a message which is intended to be received, and the reliability of rejecting messages which are not intended to be received, and this will in turn be at least in part determined by the circumstances in which any transmitter-receiver pair is going to be used.

The embodiment employs m-sequence encoding as better suited to dealing with the multi-path problem. However, it should be understood that in subsequent references thereto, other types of encoding such as those mentioned above could be substituted.

The first, known, extended code sequence is preferred to the pulse or chirp signal for identifying the channel structure since it has superior correlation properties, for which the coding was selected. However, Doppler precompensation to within about 1 knot is necessary before estimating the channel structure, because sequences will decorrelate rapidly with Doppler estimation error and the correlation is also prone to increased sidelobes.

Therefore, in addition to indicating the start of a transmission the spaced pulse signals are employed to obtain an initial measurement of Doppler. This measurement is used to compensate the first known code sequence for the purpose of more precisely identifying the channel structure, and measured Doppler is subsequently applied to remaining code sequences in the received signal for obtaining updated information on channel structure.

It is preferably continuously to update the measured Doppler by obtaining information from the remaining received code sequences, for example by obtaining a measure of residual (or differential) Doppler from immediately preceding sequence pairs (i.e. a closed loop system) although this is not absolutely necessary and adds to the complexity of the system. It is not effected in the embodiment to be described in detail, although mentioned as a possible modification.

One advantage of continuously updating the Doppler information is that it permits adjustment of the absolute start timing of each received sequence, or the relative timing between sequences, in a manner similar to pulse position modulation, so obtaining the data rate to be improved without resorting to more sequences. When closed loop Doppler is used, the use of extended coded sequences is less necessary.

The invention extends to a transceiver comprising a transmitting device according to the first or second aspects in combination with a receiving device according to the third aspect, in which certain portions may or may not be shared.

The invention also extends to method of transmitting and/or receiving a digital signal, to a digital communication system and to a method of communication.

Figure 2:
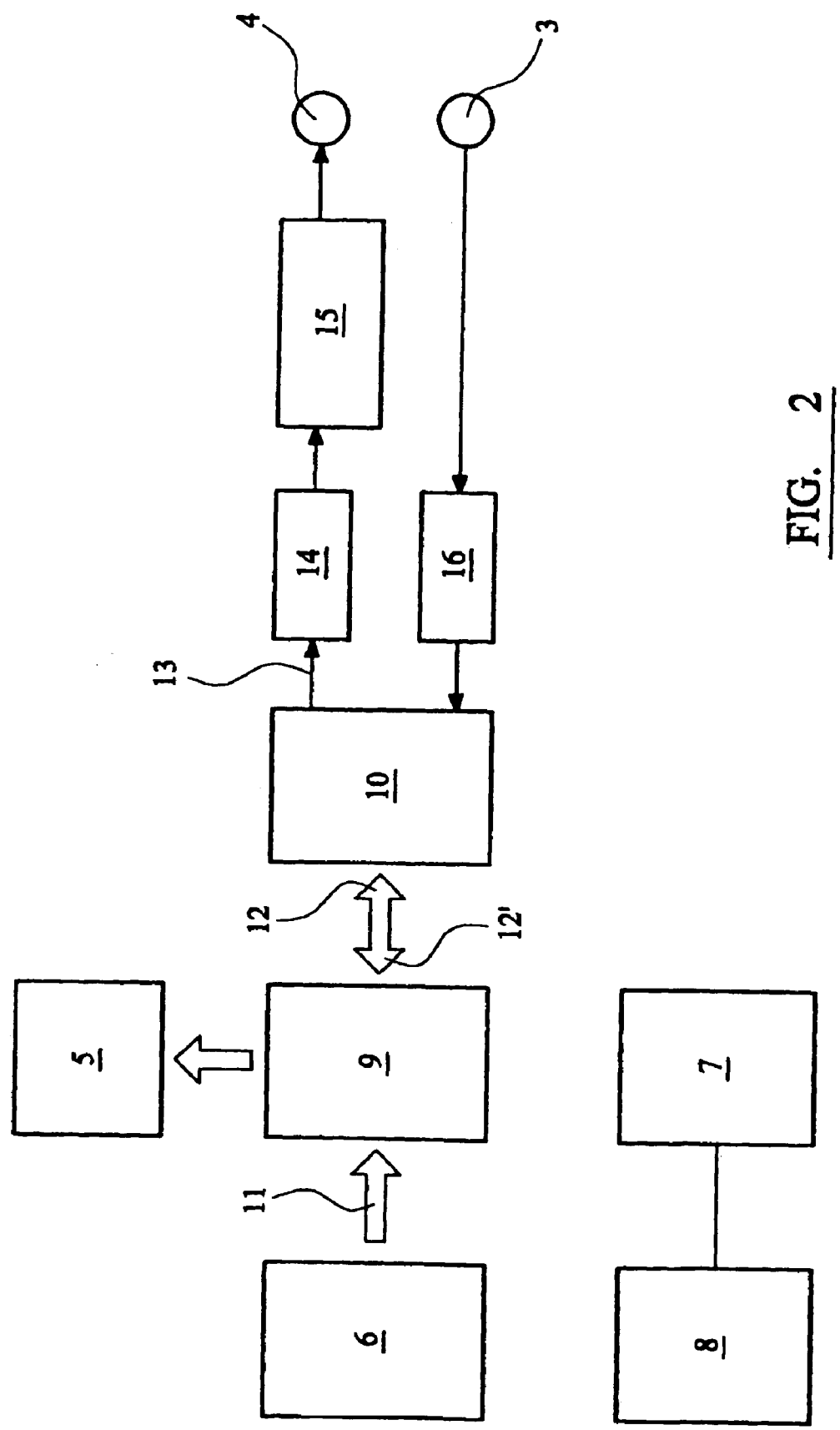
Figure 3:
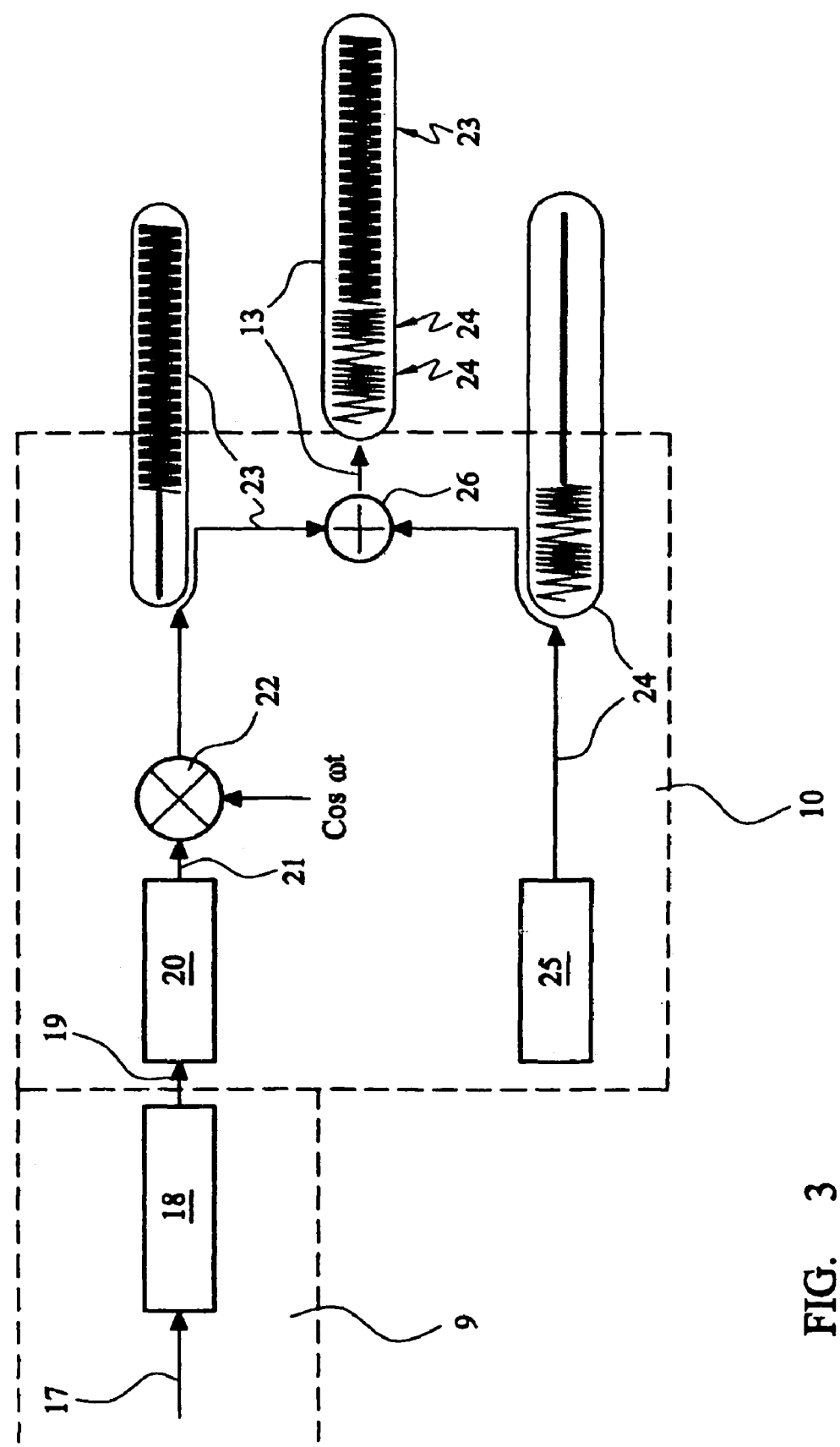
Figure 4:
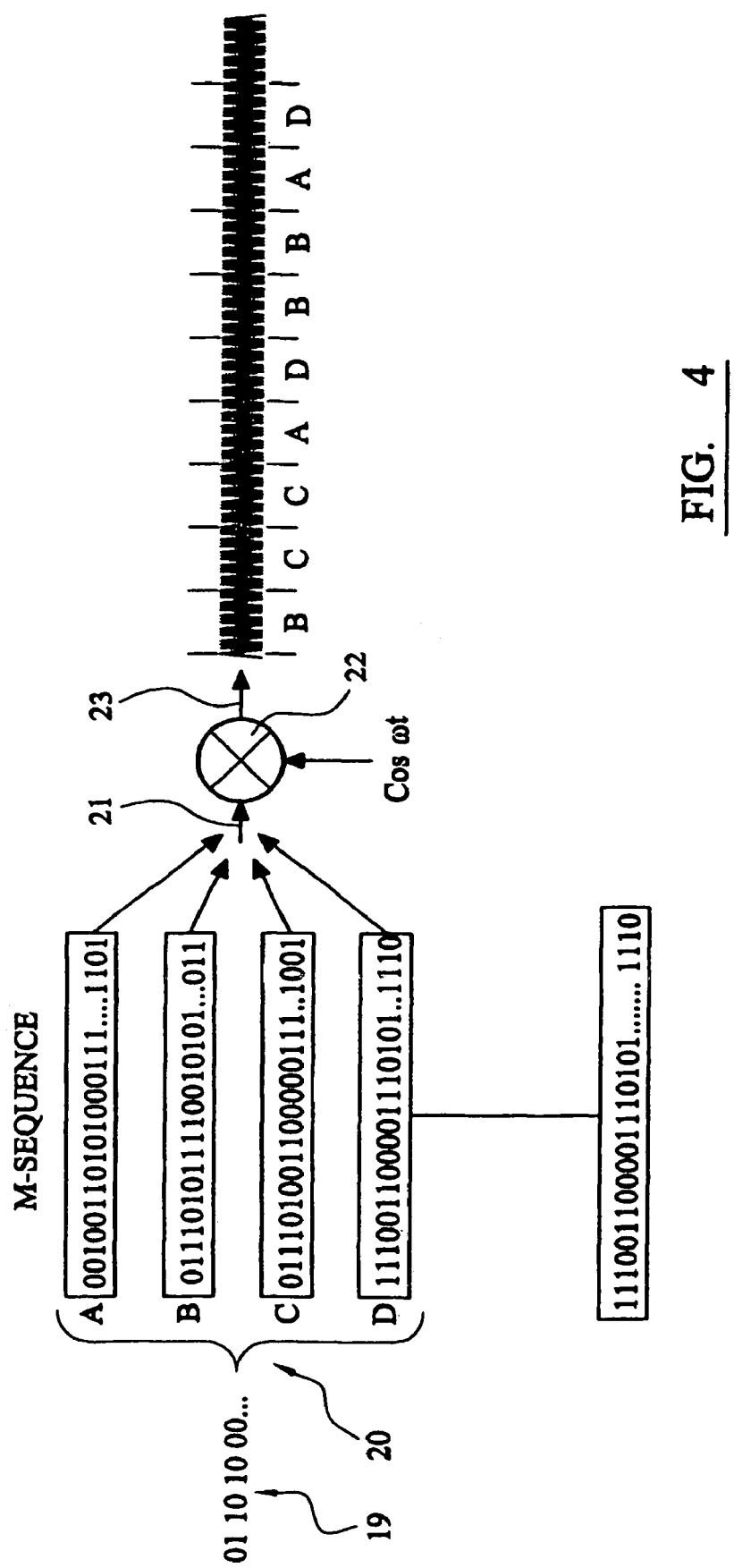
Figure 5:
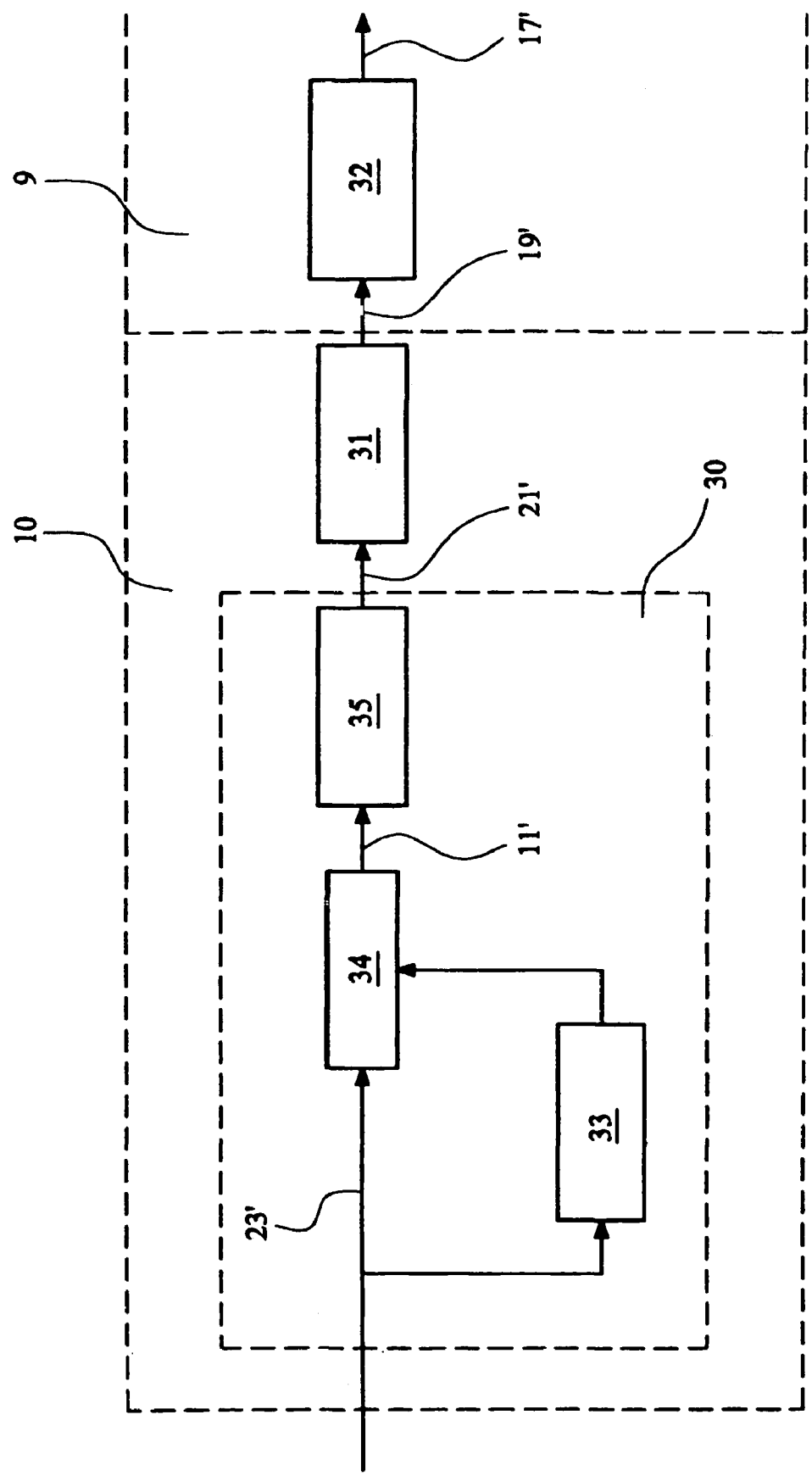
Figure 6:
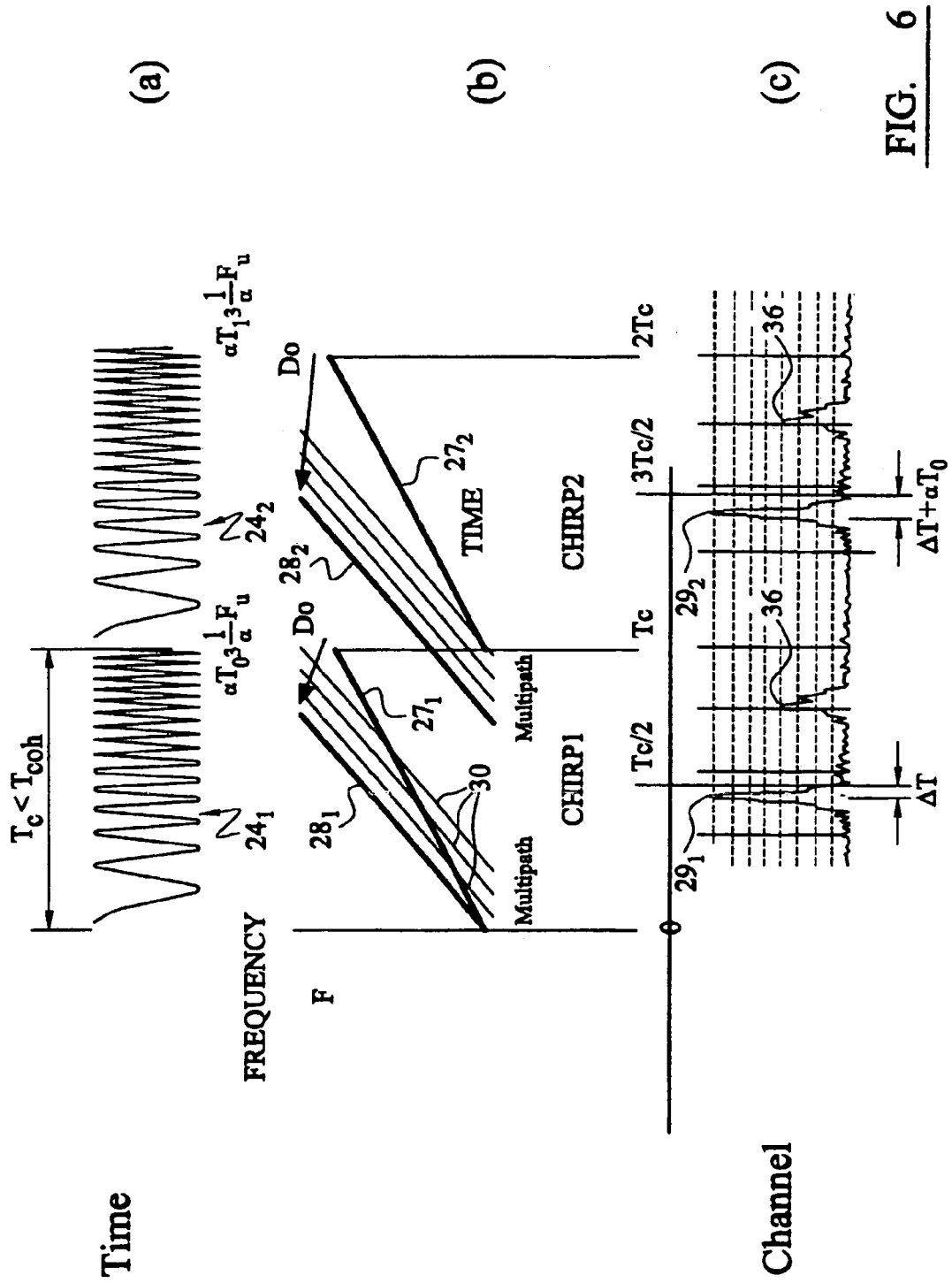
Figure 7:
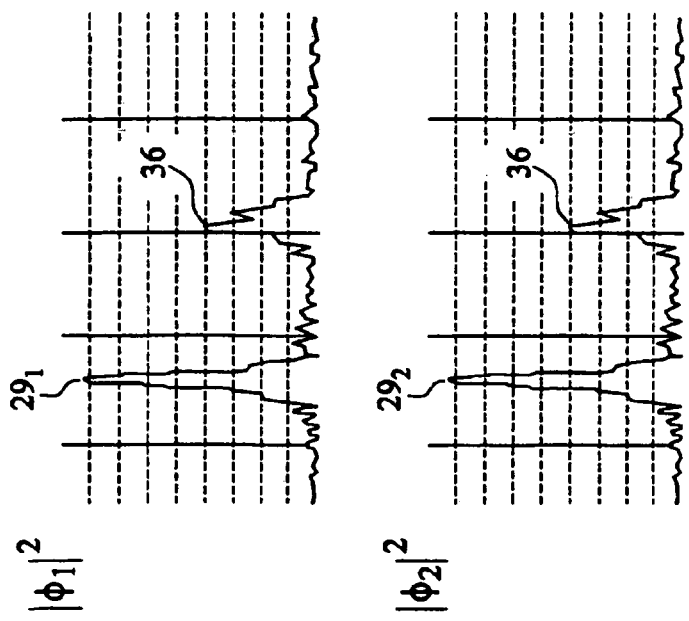
Figure 8:
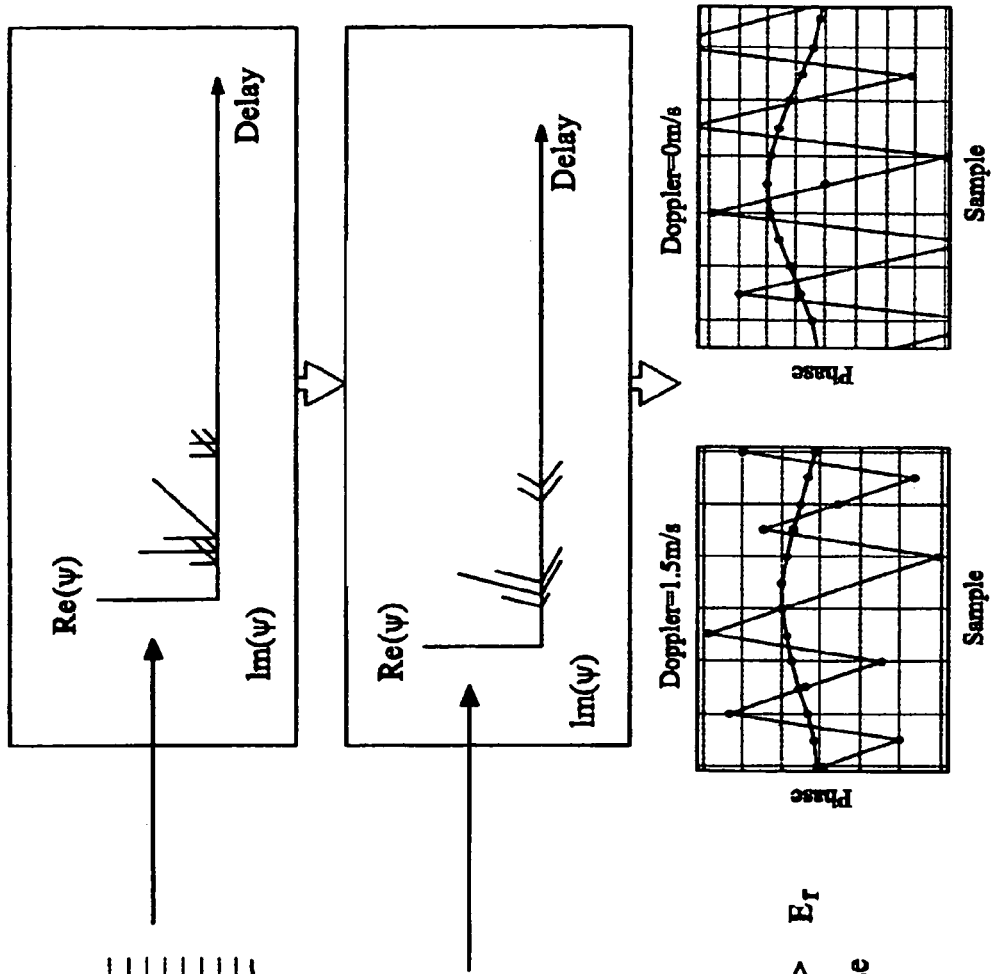

Further features and advantages of the present invention will become clear upon a consideration of the appended claims, to which the reader is referred, and upon a reading of the following description of an embodiment of the invention, in which:

FIG. 1 shows a frontal view of pair of transceivers 1 suitable for intercommunication between a pair of divers, or between a diver and a boat;

FIG. 2 schematically illustrates a block circuit diagram of circuitry within a transceiver 1 of FIG. 1;

FIG. 3 illustrates in partial schematic form the transmit side of a transceiver;

FIG. 4 schematically illustrates the working of a detail of the circuitry shown in FIG. 3;

FIG. 5 schematically illustrates part of the receive circuitry in the transceiver 1 of FIG. 1; and FIGS. 6 to 8 are plots to illustrate the operation of parts of the circuitry shown in FIG. 5, with reference to pulse waveforms in the form of chirps at the commencement of a transmitted signal.

FIG. 1 shows a pair of transceivers 1 for use by divers each comprising a metal casing 2 on one end of which is mounted a pair of acoustic hydrophones 4 for receiving acoustic signals. A single acoustic transducer 3 for transmitting acoustic signals is mounted at the top of one major face of the casing, immediately above a window of a liquid crystal, electroluminescent or other suitable display 5. Unlike liquid crystal and other passive displays, electroluminescent or other self-luminous displays are advantageous in that they do not require a separate light source. Below the window are four push button switches 6. The whole of the transceiver is designed to resist water ingress under pressures likely to be encountered during diving. Although separate transmitting and receiving transducers are shown, it is possible to provide a transducer or transducers which provide both functions.

FIG. 2 schematically illustrates a block circuit diagram of circuitry within a transceiver 1, which is operated by power supplies 7 driven from a 12 volt supply 8. Driver input and display functionality is performed by a microcontroller 9 linked to a further dedicated processor 10. In the transmitting mode the microcontroller 9 receives input from the pushbuttons 6, with a corresponding output on the display, and in response thereto eventually provides a message 11 input to the processor 10 in the form of a Reed-Solomon encoded digital stream 12, which is converted by the processor 10 to a composite modulated signal 13, amplified 14, and impedance matched 15 to the transducers 4.

In the receive mode, the output from the hydrophone 3 is preamplified 16 and input to the processor 10, which proceeds to reconstitute the transmitted information sequence 12' (where used, the prime denotes a received signal which generally corresponds to a transmitted signal). The latter is subject to Reed-Solomon decoding and other processing in processor 9 as appropriate for control of the display 5 in response to the information contained in the received signal.

FIG. 3 illustrates in partial schematic form the transmit side of a transceiver. Conjoint operation of pushbuttons 4 produces in any known manner a message 17 in the form of a digital sequence of predetermined format. Inter alia, the message may contain an identifier for the transmitting transceiver, an identifier for the destination transceiver, optionally an identifier peculiar a group of transceivers, and information that it is desired to send. The identifiers are useful where there are more than two transceivers (or a single transmitter/receiver pair), for example where there is one or more groups of divers operating from the same respective vessels, but could be omitted in other circumstances. The information could be a simple alpha-numeric sequence, or encoded, for example a set of numbers representing predetermined intelligible messages. Other codes or error checking facilities may also be included as appropriate. Provision may also be made for an identifier for messages intended for universal reception, for example alarm messages.

It will be understood that the pushbuttons 6 may be replaced or supplemented by any other manual input, such as a keyboard, or by any other form of input, for example a voice input, or an input from one or more transducers measuring local conditions in the water or peculiar to the diver (e.g. air supply, heart rate, dive depth and time, water temperature/pressure). Similarly it will be understood that the display 5 may be replaced or supplemented by any other recognisable output, such as an audible alarm or a flashing light to indicate reception of a message (which may need cancelling before a message is acknowledged), or a voice synthesiser (or a voice output if the transmitted information corresponds to an audio waveform), for example from a microphone. It will also be understood that the processor 9 or processor 10 may implement some form of known message transmission protocol, e.g. for confirmation of message reception, or for re-transmission as a message in the absence of such confirmation, or for checking that no other transmission is present before sending its message.

Message 17 is subject to Reed-Solomon encoding 18 in the processor 9 for error checking/correction at a destination transceiver. The resulting digital string 19, which is coupled to an m-sequence encoder 20 comprises symbols of length n bits and is prefaced by a predetermined block of n bits (not shown) .

It is known to convert each symbol into a corresponding pseudo-random maximal-length sequence of length m chips (bits) (an "m-sequence") where m>n. Since a symbol of n bits will have $2^n$ possible bit patterns, there will be $2^n$ corresponding m-sequences, which are determined to be those selected from the $2^m$ possible sequences of length m such as will provide the best auto-correlation coefficients, to facilitate identification thereof in a received signal (and so of the corresponding n-bit symbol) and to reduce the amount of cross-correlation with others of the m-sequences.

In the embodiment, the encoder 20 has stored therein $2^n$ extended m-sequences each of which comprises one of said $2^n$ m-sequences but prefaced and/or followed by an extension of x or y chips respectively. The x-bit extension is a repeat of the final x chips of the m-sequence. The y-bit extension is a repeat of the first y chips of the m-sequence. The x- and y- bit extensions are sometimes termed "cyclic extensions", for obvious reasons. While either x or y may be zero, it is preferred that both are finite quantities. While x and y may be unequal, in the embodiment they are equal. Thus in the case of a base sequence of the form ABC where B represents a core portion and A and C are terminal portions, an extended m-sequences of the form CABC, or ABCA, or CABCA, could be derived as desired.

The function of the extensions will be explained later, as will the preferred sizes of m, n, x and y. For ease of reference and distinction, an "normal" m-sequence will henceforth be referred to as a "base sequence" and an extended m-sequence will be referred to as an "extended sequence".

As schematically shown in FIG. 4 for the case where n is 2, giving rise to 4 extended sequences A, B, C and D, encoder 20 acts on the string 19 of symbols to select the corresponding extended sequence for forward transmission to a modulator 22 where it is bi-phase modulated to a suitable carrier frequency ω. Thus the input 21 to modulator 22 consists of a series of extended sequences, the first corresponding to the predetermined sequence mentioned above, and the rest determined by the message 12. Two chirp signals 24 of predetermined form length and relative timing are produced by a generator 25 and added at 26 at the front of the modulated signal 23 to produce the composite signal 13 which is coupled to the transducers 4 for transmission to another diver or a surface vessel, for example.

It will be appreciated that there is a predetermined extended sequence between the extended sequences representing the message 12 and the chirp signals 24. It is possible for this to be provided in a variety of ways, for example by the use of a separate generator, by arranging for encoder 18 to generate a predetermined symbol at the start of its encoding process, by arranging for encoder 20 to generate the predetermined extended sequence at the start of its encoding process, or by arranging the chirp generator 14 to produce both the chirps followed by the predetermined extended sequence.

The extended m-sequences employed by the encoder 9 are each composed of a base m-sequence of m chips, where m is significantly greater than n, and preferably m/n is at least 16, more preferably at least 32, and even more preferably at least 64 (the ratio m/n effectively defines the processing gain one achieves in the receiver correlators. In practice fairly large processing gains may be used to help overcome multipath and user interference. For this application the ratio m/n is 255/2. Obviously this ratio impacts on the system data rate and it would be possible to reduce the ration to provide higher data throughput. The base m-sequences are pseudo-random maximal-length m-sequences providing in known manner the best auto-correlation coefficients for their length, to facilitate identification thereof (and so of the corresponding n-bit symbol) and to reduce the amount of cross-correlation with others of the base m-sequences.

The signal 13 comprises the (non-spaced) sequence of chirp 1, chirp 2, $E_0$, $(Em)_x$, where chirp 1 and chirp 2 are the chirps 24, $E_0$ is the predetermined extended sequence modulated on the carrier and $(Em)_x$ is the series of extended sequences determined by the message 7 modulated on the carrier. Since as transmitted the duration of each of these items is known, their relative timings as transmitted is also known. After certain initial corrections and demodulation, to be described, it will thus be possible to break down a received signal into a like sequence.

FIG. 5 schematically illustrates part of the receive circuitry in the transceiver 1, where the portion 30 serves to effect the aforesaid initial correction and demodulation of the output 23' from the receive transducer 3 to provide a series 21' of received extended sequences.

Assuming initially that the transmitted signal is subject neither to Doppler nor multi-path propagation, it could be directly received demodulated and the chirps extracted to provide a signal 21' similar to that produced by the encoder 20, for subsequent decoding at an m-sequence decoder 31 followed by a Reed-Solomon decoder 32 to reconstitute the message as an output 17'.

In such a case, the chirp signals and extended sequence $E_0$ would function merely to denote the start of a transmission, providing the timing whereby $(Em)_x$ may be split up into component extended sequences. In known manner in decoder 31 each component Em is passed through $2^n$ parallel correlators relating respectively to each of the base sequences, the outputs of which are compared to determine which bit pattern is to replace that extended sequence. The extended sequences serve to reduce the sidelobe levels when performing the correlation between the replica sequence and the received sequence which may have multipath. While the extended sequences could also serve to accommodate any jitter in the received signal, in practice jitter is accommodated by summing correlations at the time delays of the significant multipath components plus or minus one or two lags to allow for any jitter.

The top plot (a) of FIG. 6 shows the chirp signals 24 as immediately successive chirps $24_1$ and $24_2$ each of duration $T_C$, the first chirp commencing at time T=0. The middle plot (b) of frequency F against time T shows lines $27_1$ and $27_2$ corresponding to chirps $24_1$ and $24_2$ as transmitted, and, in the absence of Doppler and multi-path propagation, as received.

When Doppler is present, but without multi-path propagation, the received signal is effectively a version of the transmitted signal which is compressed or expanded by an amount and in a direction determined by the effective relative motion between source and receiver. The lines $28_1$ and $28_2$ of FIG. 6 illustrate this for the two chirps when the Doppler is of a sense giving waveform compression. It will be seen that the plots 27 are effectively moved as broadly indicated by the arrows Do to give the plots 28 which are of shorter duration and rising to higher terminal frequencies, the amount and sense of the movement being indicative of the magnitude and sense of the Doppler effect. Also, since the two chirps $28_1$ and $28_2$ are immediately consecutive, the start of plot $28_2$ is displaced from $T_C$ by an amount and in a sense indicative of the magnitude and sense of the Doppler effect.

The magnitude of the complex correlation of the received signal against the original chirp waveform produces the signal shown in plot (c) of FIG. 6, where the main peaks $29_1$ and $29_2$ correspond to the plots $28_1$ and $28_2$ respectively. Instead of sharp peaks at $T_C/2$ and $3T_C/2$ which would be produced from the plots 27, the peaks 29 are somewhat broadened and occur earlier by amounts $\Delta T$ and $(\Delta T+\alpha Tc)$ respectively.

It is possible to gauge Doppler from the values of $\Delta$ and/or $\alpha$. However, as previously mentioned, in reality the received signal is also subject to multi-path propagation, as shown in the finer lines 30 of FIG. 6(b), representing sub-signals, which tends to render less precise the information gained from the main signal.

It is therefore preferred to generate and buffer the complex correlation result between the two received chirp signals and the original chirp waveform, to provide complex output signals $\phi_1$, $\phi_2$ as depicted by $|\phi_1|^2$ and $|\phi_2|^2$, FIG. 7, similar to those of FIG. 6 (c). By inspection of the output signals (e.g. as stored in a buffer), and use of a thresholding function, a portion or selected time window is selected from the output signal. These portions are temporally centred on the times when the correlation outputs have their respective maximum values, and are sized to contain other significant signal peaks arising from multi-path propagation.

Subsequently a complex cross-correlation is performed of each selected portion against the other, as is illustrated in FIG. 8. This process, provides a more accurate determination of Doppler effect, and uses information not only from the main signal, but also from significant sub-signals occurring close in time to the main signal (under many conditions most sub-signals will arrive closely spaced from the main signal, and signals further temporally spaced therefrom will have relatively little energy).

In FIG. 5, the Doppler measurement and start of message information based on the chirps is derived in synchronisation circuitry 33 which provides an output for controlling a re-sampler 34 to which is coupled the output of the preamplifier 16. In this manner the received signal is converted to a (passband) signal 11' having a carrier at the frequency $\omega$ of the modulator 10, for demodulation or down conversion in a digital converter 35 to provide the signal 21'.

When multiple path propagation is taken into account, the correlated chirp signals may take the form shown in FIG. 7, where there is at least one additional subordinate peak 36 corresponding to a sub-signal (these also occur in FIG. 6(c)). As shown, the peaks are actually composite, with components corresponding to closely spaced micro paths which constitute a macro-path for the sub-signal in question, but the fine structure is conveniently ignored.

It is known to process multi-path signals to produce a reinforced main signal, and to increase the signal to noise ratio, or the veracity, of the main signal. One known method of so doing is to measure the timing between the subordinate signals and the main signal, and to control a filter such as a FIR filter so that the signals are effectively added. For example the filter may take the form of a tapped delay line into which the original signal is fed and from which signals are taken at controlled delays so that the various paths are brought into synchronism, the respective signal components being read and added together. The controlled delays may be variable. The general process is known as "raking".

While the channel structure information provided by the correlation at the synchronisation circuit 33 could be used for dealing with multi-path propagation (see FIG. 7), in the embodiment of FIG. 5 this function is left to the m-sequence decoder 31, as will be described later. Thus the signals 11', 21' from re-sampler 34 and converter 35 still retain the multi-path structure.

As previously noted, using the known relative timing between portions of the transmitted signal 21', blocks or sequences of length m in positions corresponding to the original (unextended—i.e. the extensions are ignored for this purpose) m-sequences are selected from the received and temporally corrected signal for correlation with the $2^n$ base m-sequences to determine the corresponding portion (symbol) of the signal 19' and message 17'. If the correlators act directly on the signal 21' as received, their outputs in fact also contain information regarding the sub-signals, and if identification of the m-sequences is performed directly on these outputs, the sub-signal information can interfere therewith.

Therefore on the basis of the determined channel structure the signal 21' is subject to a filtering process within the decoder 31 which in principle is similar to that described above in relation to the FIR filter, so as constructively to add/synchronise signals with different times of arrival whereby to increase the signal to noise ratio and to reduce the effects of multi-path propagation, and the "filtered" outputs thus obtained are used for the aforesaid determination (by correlation) of the m-sequences. It is preferred that this filtering process is weighted based on the relative energies of the channel paths previously identified, a process sometimes known as maximum ratio combining (MRC).

This whole process is preferably carried out in both the time and Fourier domains as appropriate for ease of signal processing, and adds considerably to the robustness of the communication. Preferably, when calculating the channel structure the correlation processing is performed in the Fourier domain as this allows faster evaluation of the time lagged correlation result. After determining the significant path delays and their weights, the correlation processing reverts to the time domain, thus saving processing time since it is necessary to sum the weighted correlations for each path delay and for each possible sequence. So for $2^n$ sequences and P paths it is necessary to compute $P \times 2^n$ complex correlations. The largest correlation result from each of the $2^n$ sequences identifies the maximum likelihood transmitted symbol. When this has been identified then the system will re-compute the channel estimate by performing a Fourier domain correlation between the maximum likelihood symbol and the current received time vector. This resets the path delays and weights ready for the next received sequence. It inherently enables the system to track Doppler changes (timing drift) from sequence to sequence either due to imprecise initial Doppler estimation or from platform acceleration.

Thus far, fixed Doppler and multi-path propagation could be accounted for. However, both of these factors may vary over the length of a transmission, thus potentially importing errors.

As has already been noted for the case of the two chirps 24, complex autocorrelation provides information on the channel structure, and a subsequent complex cross-correlation of the autocorrelation results against each other provides information concerning Doppler. This process can be carried forward to the use of the received extended sequences.

The first received extended sequence is known, and the Doppler is assumed to be that obtained by use of the chirp signals, so permitting re-sampling and demodulation of the first sequence. Then (auto) correlation of the known base sequence against the known first extended sequence provides a correlation signal with more precise channel structure information.

In a version of the system where Doppler is also continuously updated from measurements performed on successive pairs of sequences, the updated Doppler (or differential Doppler) measurement could then be fed back to the decoder 31 and the re-sampler 34 for re-sampling the second modulated extended sequence, suitably buffered if necessary. In addition the updated channel information can likewise be used within the decoder 31 for use during raking of the second modulated extended sequence. However, for providing a further update on channel information, once the second extended sequence is identified the second modulated extended sequence of the unraked signal 21' is correlated against the corresponding base sequence and the updated channel structure is derived from the result in known manner for use in raking the third modulated extended sequence, and so forth in an iterative process.

While there is a lag in the production of these measurements, it is sufficiently small that there is little or no likelihood of corruption in the signal 19' on account of Doppler or multi-path propagation.

The use of an extended sequence has already been described in terms of dealing with time jitter in the received signal. It will be observed that it also helps in the obtaining of information regarding sub-signal paths, which might be missed if using a transmitted base sequence.

Thus this embodiment of the invention enables the provision of a broadband transmission, not so subject to fading as a narrowband transmission, copes well with Doppler effects, and utilises more of the transmitted signal energy, including energy from multiple paths, to enhance accuracy of message reproduction.

In the present embodiment n is 2, m is 255, a cyclic extension is provided at each end of length 20 chips. These values are a matter of choice according to the transmission conditions likely to be encountered, computing power available, and other circumstances. With present computing powers, in particular for portable transceivers, n is preferably no more than 4, to place a limit on the number of correlations that are necessary; however, it will be appreciated that greater values of n can enable faster transmission overall, albeit at the expense of a rapidly increasing number $n^2$ of correlations to be performed at the receiving transceiver.

These latter considerations must be balanced against the fact that an increase in n for a fixed value of m reduces the ratio m/n, which ratio effectively defines the processing gain obtainable in the receiver correlators. In the resent application it is preferred to use fairly large processing gains to help overcome multi-path and user interference. The value of m/n is preferably at least 31, and preferably at least 63 and even more preferably at least 127. The length of the extension(s) preferably lies between 16 and 128 when m is 255, and more generally it lies between $m^{1/2}$ and m/2.

What is claimed is:

1. A digital underwater transmission device comprising means for receiving or generating an information sequence of digital bits, means for partitioning said sequence into a succession of symbols each comprising n bits where n is equal to or greater than one, so that there are $2^n$ potential symbols, coding means for replacing each said symbol with a corresponding base code sequence of length in chips (bits) to produce a signal, wherein the code has good correlation properties and the value of m/n is at least 32, modulating means for modulating a carrier with the signal from the coding means, and transmission transducer means coupled to the output of the modulating means for transmitting an acoustic signal through water.

2. A transmission device according to claim 1 wherein the value of n is at least 2.

3. A transmission device according to claim 1 or claim 2 wherein the value of m is at least 64.

4. A transmission device according to claim 1 and including means for providing a predetermined symbol at the head of said information sequence, or for providing a predetermined code sequence at the start of the coded information sequence representative of a predetermined symbol.

5. A transmission device according to claim 1 wherein the code has good auto-correlation properties or good cross-correlation rejection properties.

6. A transmission device according to claim 1 wherein the code is selected from (a) a pseudo-random maximal length sequence; (b) a Gold code; and (c) a Kasami code.

7. A transmission device according to claim 1 wherein said modulating means is arranged to perform bi-phase modulation.

8. A transmission device according to claim 1 and including means for incorporating redundancy into said information sequence for error correction.

9. A transmission device according to claim 1 including means for prefacing said modulated carrier with two pulse signals of known timing relative to each other and the modulated signal.

10. A digital underwater receiving device adapted for responding to a signal transmitted from a transmission device of the type according to claim 1, the receiving device comprising means for receiving and demodulating or down-converting said signal, means for deriving from the demodulated signal a plurality of received code sequences each related to a respective one of said transmitted code sequences, first correlating means for correlating each said received code sequence with each of said $2^n$ base code sequences, identification means for determining which of the code sequences provided a maximum likelihood result, and decoding means for deriving from each maximum likelihood result the corresponding decoded symbol thereby to synthesise a received information sequence.

11. A receiving device according to claim 10 and including Doppler gauging means for detecting and gauging the Doppler effect in the received signal and Doppler correction means for correction for said Doppler effect prior to demodulation or down-conversion.

12. A receiving device according to claim 11 wherein said Doppler correction means comprises re-sampling means coupled for re-sampling the output of said receiving transducer means in response to an output of said Doppler gauging means.

13. A receiving device according to claim 11 or claim 12, wherein said identification means includes means for providing the correlated result of a said received sequence with a corresponding reference sequence, and of the next received sequence with a corresponding reference sequence, and the Doppler gauging means comprises second correlating means for cross-correlating said results against each other to provide a measure of Doppler effect.

14. A receiving device according to claim 10 wherein a said correlating means is at least in part complex correlating means.

15. A receiving device according to claim 10 and comprising sub-signal means for identifying significant sub-signals arising from multiple path propagation and temporally displaced from a main or direct signal.

16. A receiving device according to claim 15 wherein said sub-signal means includes means for effectively synchronizing at least one said sub-signal with said main or directed signal, and for effectively adding said main and sub-signals together.

17. A receiving device to claim 15 or claim 16 wherein said sub-signal means is coupled to the outputs of said first correlating means and said identifying means for deriving the relative timing between the sub-signal(s) and the main or direct signal.

18. A receiving device according to claim 10, for use with a signal from a transmission device comprising means for receiving or generating an information sequence of digital bits, means for partitioning said sequence into a succession of symbols each comprising n bits where n is equal to or greater than one, so that there are $2^n$ potential symbols, coding means for replacing each said symbol with a corresponding base code sequence of length m chips (bits) to produce a signal, wherein the code has good correlation properties and the value of m/n is at least 32, modulating means for modulating a carrier with the signal from the coding means, and transmission transducer means coupled to the output of the modulating means for transmitting an acoustic signal through water including means for prefacing said modulated carrier with two pulse signals of known timing relative to each other and the modulated signal, and further including pulse detection means for identifying the occurrence of said pulse signals.

19. A receiving device according to claim 18 and including means for deriving from said pulse signals a measure of Doppler end/or channel structure for modifying the subsequently receives signal.

20. A receiving device according to claim 18 or claim 19 and including timing means for partitioning the remainder of the received signal according to the time of receipt of a said pulse signal.

21. A communication system comprising one or more transmission devices according to claim 1 and one or more separate receiving devices according to claim 10.

22. A digital underwater transceiver comprising a transmission device according to claim 1 and a receiving device according to claim 10.

23. A method of transmitting a sequence of digital bits representing information, comprising the steps of partitioning said sequence into a succession of blocks each comprising n bits where n is equal to or greater than one, producing a signal by replacing each said block with a transmitted series of bits consisting of or comprising a code sequence of length m bits having a predetermined correspondence with the bit or pattern of bits in the block, wherein the code is selected to have good correlation properties, and the value of m/n is at least 32, modulating a carrier with the resulting signal, and transmitting an acoustic wave signal corresponding to said modulated carrier through water.

24. A method according to claim 23 wherein the code has good auto-correlation properties or good cross-correlation rejection properties.

25. A method according to claim 23 or claim 24 wherein the code is selected from (a) a pseudo-random maximal length sequence; (b) a Gold code; and (c) a Kasami code.

26. A method for receiving and decoding a signal generated by the method of claim 23 comprising the steps of receiving said signal, demodulating or down-converting the received signal, partitioning the demodulated or down converted signal into a plurality of received series of bits each corresponding to a respective one of said transmitted series, correlating each said received series with each of said $n^2$ maximal sequences, determining which of the maximal sequences proves an auto-correlated result and to providing in accordance therewith a corresponding said block of n bits and thus the corresponding said received information sequence.

27. A method of communication comprising performing a method of transmitting a sequence of digital bits representing information, comprising the steps of partitioning said sequence into a succession of blocks each comprising n bits where n is equal to or greater than one, producing a signal by replacing each said block with a transmitted series of bits consisting of or comprising a code sequence of length m bits having a predetermined correspondence with the bit or pattern of bits in the block, wherein the code is selected to have good correlation properties, and the value of m/n is at least 32, modulating a carrier with the resulting signal, and transmitting an acoustic wave signal corresponding to said modulated carrier through water to provide a transmitted signal together with performing the method off claim 26 on the transmitted signal when received.

* * * * *